(12) United States Patent
Nielsen

(10) Patent No.: US 6,373,504 B1
(45) Date of Patent: Apr. 16, 2002

(54) LOCAL SORTING OF DOWNLOADED TABLES

(75) Inventor: Jakob Nielsen, Atherton, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 362 days.

(21) Appl. No.: 08/941,186

(22) Filed: Sep. 30, 1997

(51) Int. Cl.[7] .................................................. G09G 5/00
(52) U.S. Cl. ...................... 345/739; 345/738; 345/825; 707/3
(58) Field of Search ............................ 707/3, 503, 513, 707/7; 345/738, 739, 810, 811, 812, 813, 825

(56) References Cited

U.S. PATENT DOCUMENTS

| | | | |
|---|---|---|---|
| 5,396,621 A | * | 3/1995 | MacGregor et al. ......... 707/503 |
| 5,563,997 A | * | 10/1996 | Fisher ........................... 707/7 |
| 5,615,366 A | | 3/1997 | Hansen ........................... 707/7 |
| 5,710,901 A | * | 1/1998 | Stodghill et al. ............ 707/503 |
| 5,745,891 A | * | 4/1998 | Minakuchi et al. ............. 707/3 |

FOREIGN PATENT DOCUMENTS

| | | |
|---|---|---|
| EP | 0 585 192 A1 | 3/1994 |
| EP | 0 774 722 A2 | 5/1997 |

OTHER PUBLICATIONS

"Microsoft Excel Version 5.0—Benutzerhandbuch", 1993 Microsoft Corporation, Ireland, XP002117701 pp. 448–449, 700–702.

"WATCOM VX–REXX for OS/2—Programmer's Guide and Reference", Nov. 1993, WATCOM INTERNATIONAL CORPORATION, Ontario, CA, XP002117702, pp. 96–103.

* cited by examiner

Primary Examiner—Ba Huynh
(74) Attorney, Agent, or Firm—McDermott, Will & Emery

(57) ABSTRACT

Sorting of table data is enhanced by providing hidden sort keys associated with table cell data. When table data is displayed, the hidden sort keys are not, but they may nevertheless be used as a basis for sorting table information. Thus table data may be presented in a variety of views with alternative arrangements of data, based on whether each column or row of table data is sorted by content or by the hidden sort key or sorted in ascending or descending order. The table may selectively be restored to its original configuration after sorting. Sorting is invoked by interpreting mouse clicks in a header cell of a table column or row.

18 Claims, 10 Drawing Sheets

---

SORT MENU

1. SORT BY HIDDEN KEY ASCENDING

2. SORT BY HIDDEN KEY DESCENDING

3. SORT BY CONTENT ASCENDING

4. SORT BY CONTENT DESCENDING

5. RESTORE TABLE TO ORIGINAL ORGANIZATION

```
<TH>Header 1
<TH>Header 2
<TH>Header 3
<TR>
<TD>Cell-11
<TD>Cell-12
<TD>Cell-13
<TR>
<TD>Cell-21
<TD>Cell-22
<TD>Cell-23
<TR>
<TD>Cell-31
```
. . .  `<TD>Cell-N3`

FIG. 2A

```
<TH> Rank
<TD Sortkey=1>2nd Lieutenant
<TD Sortkey=8>Colonel
<TD Sortkey=9>Brigadier General
```

FIG. 2B

Header1
Cell-11
Cell-21
Cell-31...

Header2
Cell-12
Cell-22
. . .

Header3
Cell-13
Cell-23
...Cell-N3

FIG. 3

SORT MENU

1. SORT BY HIDDEN KEY ASCENDING
2. SORT BY HIDDEN KEY DESCENDING
3. SORT BY CONTENT ASCENDING
4. SORT BY CONTENT DESCENDING
5. RESTORE TABLE TO ORIGINAL ORGANIZATION

FIG. 5A 0 0 CONTENT-ASCENDING
0 1 CONTENT-DESCENDING
1 0 SORTKEY-ASCENDING
1 1 SORTKEY-DESCENDING

FIG. 5B

- LETTERS ARE COMPARED CASE INSENSITIVE
- COMPARING SORTKEYS, THE SMALLER VALUE IS PLACED BEFORE THE LARGER VALUE
- CELLS WITH A SORTKEY ARE PLACED BEFORE CELLS WITH NO SORTKEY
- SMALLER NUMBERS ARE PLACED BEFORE LARGER NUMBERS
- NUMBERS ARE PLACED BEFORE LETTERS
- LETTERS EARLIER IN THE ALPHABET ARE PLACED BEFORE LETTERS LATER IN THE ALPHABET
- IF A CELL CONTAINS AN IMAGE, CELL IS SORTED BY SORTKEY, OR, IF NONE, BY ALT TEXT DESCRIPTION OF IMAGE
- TWO CELLS OTHERWISE EQUAL, THE ONE RECEIVED FIRST IN THE ORIGINAL TABLE IS PLACED FIRST

FIG. 8

LOCAL SORTING OF DOWNLOADED TABLES

BACKGROUND OF THE INVENTION

1. Field of the Invention

The invention relates to computer systems and, more particularly, to the sorting of tables and particularly tables which have been downloaded across a network.

2. Description of Related Art

The sorting of tables is well known in the art. Such sorting is found widely in spreadsheet programs. Commonly, one column of the spreadsheet is specified and functions as a sort key for the ordering of the tuples or rows of the spreadsheet. In data bases, it is common that one or more fields in the data base are specified as a sort key. However, these sort keys take up display space and a change in sort key requires generation of a new index.

The Problems

Tables downloaded across networks, such as the World-wide Web, are becoming larger and larger. It would be desirable to view the data from these downloaded tables from a variety of perspectives. However, typical browsers do not provide for the sorting of table data. Further, there is no mechanism provided by which the author of a table can specify alternative arrangements of data. Further, as noted above, sort keys are required to be displayed as a field in a data base or a table in order to be used for sorting.

SUMMARY OF THE INVENTION

In accordance with the invention, a hidden sort key is provided and associated with cell data in a table. Preferably, this takes the form of an attribute to be added to a table data descriptor, such as <TD>, which attribute can be utilized to sort the cells in the table column. In this way, the author can specify alternative arrangements of the data from the order in which the table is presented.

One aspect of the invention relates to expanded browser functionality by which tables can be sorted utilizing a hidden sort key.

The invention relates to a computer having a graphical user interface, running on a processor, said graphical user interface comprising a sort routine for rearranging table data based on one or more hidden sort keys.

The invention also relates to a method of sorting table data by associating a hidden sort key with at least one cell of table data and selectively sorting said table data based on said hidden sort key.

The invention also relates to a method of authoring table data by associating a sort key with cell data so that the sort key is not displayed.

The invention also relates to a method of displaying table data, by retrieving table information containing at least one hidden sort key over a network and selectively sorting said table information based on said hidden sort key.

The invention also relates to systems and computer program products for carrying out these techniques.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which:

FIG. 2A is an example of an HTML-like table specification.

FIG. 2B illustrates an extension of a table data HTML tag to include a hidden sort key associated with a cell entry.

FIG. 3 illustrates an exemplary browser display of the table shown in FIG. 2A.

FIG. 5A is an exemplary pop-up menu used in accordance with one embodiment of the invention.

FIG. 5B shows the semantics of exemplary flags used in accordance with one embodiment of the invention.

FIG. 8 is an exemplary but preferred list of rules used during sorting.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
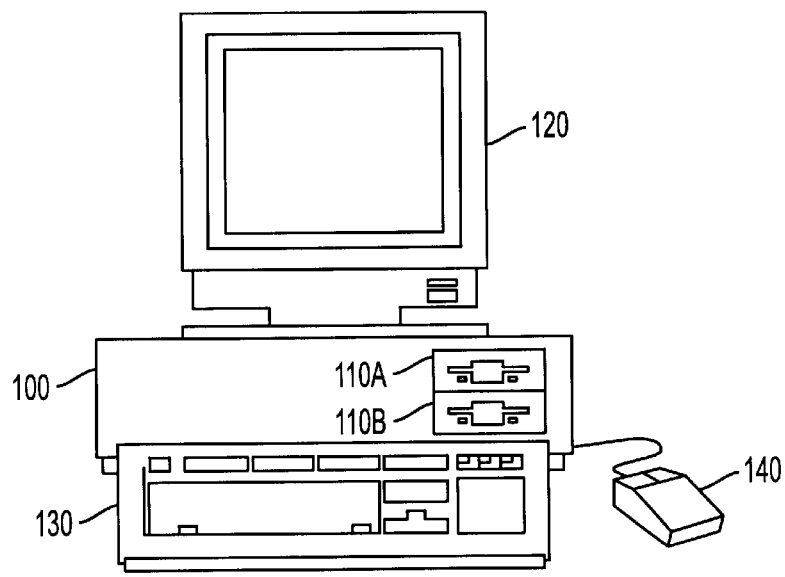
FIG. 1A is a view of exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
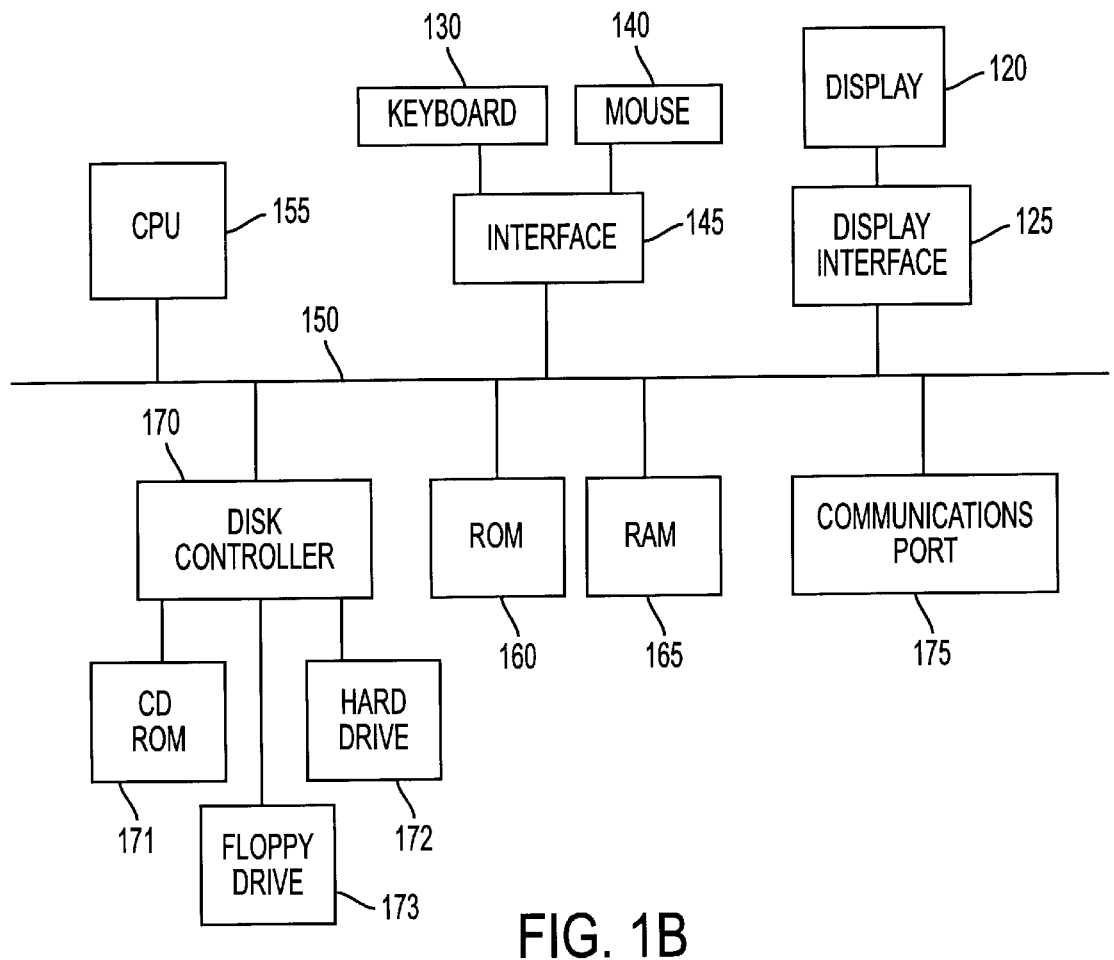
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
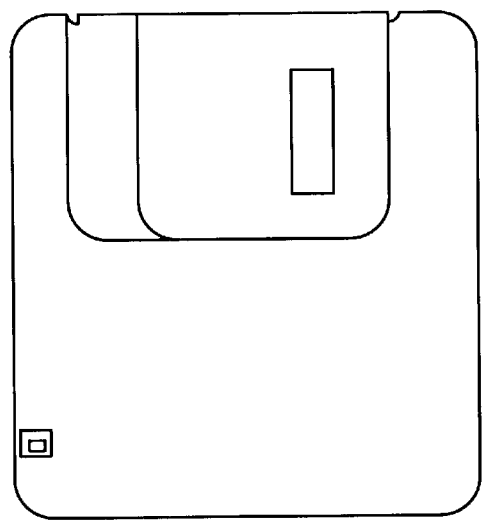
FIG. 1C is an illustration of an exemplary memory medium suitable for storing program and data information in accordance with the invention.

FIG. 1C illustrates an exemplary memory medium which can be used with drives such as 173 in FIG. 1B or 110A in FIG. 1A. Typically, memory media, such as a floppy disk, or a CD ROM, or a Digital Video Disk, will contain the program information for controlling the computer to enable the computer to perform its functions in accordance with the invention.

Figure 1D:
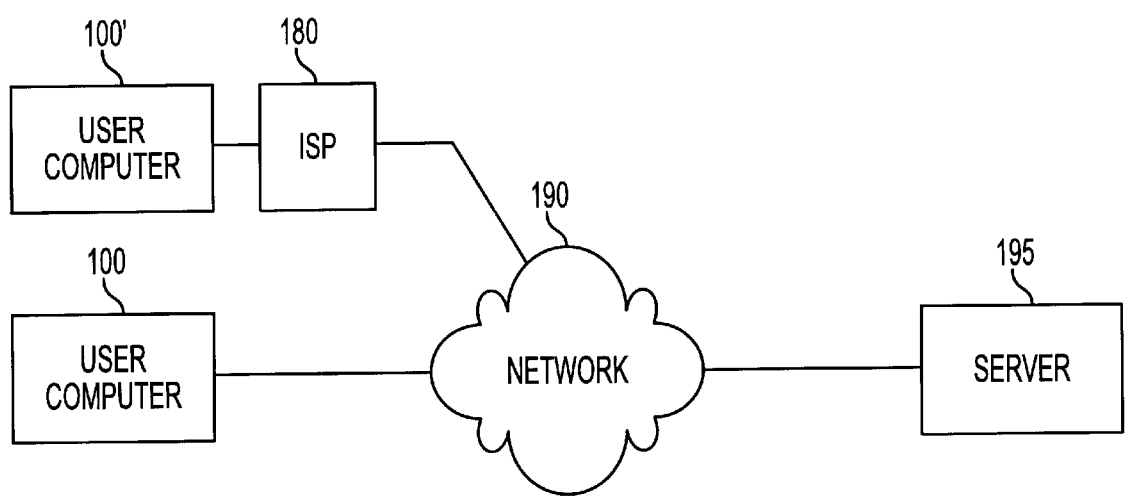
FIG. 1D is a block diagram of a network architecture suitable for carrying data and programs in accordance with some aspects of the invention.

FIG. 1D is a block diagram of a network architecture suitable for carrying data and programs in accordance with some aspects of the invention. A network 190 serves to connect a user computer 100 with one or more servers, such as server 195 for the download of program and data information. A user 100' can also connect to the network via a network service provider, such as ISP 180.

FIG. 2A is an example of an HTML-like table specification. In the example shown in FIG. 2A there are three table heading entries, each preceded by the table heading tag <TH>. These table headings have been given the functional description Header 1, Header 2 and Header 3. A plurality of cells of the table are defined using the table data tag <TD>. The contents of each table data entry are specified following the table data tag and, have been given, in this example, the designator Cellij.

These examples are not intended to be syntactically correct HTML statements, but rather to illustrate the organization of the data. It is clear that each entry need not necessarily be on a separate line, but rather can be distinguished by the presence of separators. Similarly, there has been no attempt to show an entry which might specify a box to be drawn around the table data when the table data is displayed.

FIG. 2B illustrates an extension of a table data HTML tag to include a sort key attribute. In FIG. 2B, only a portion of the table data associated with a single column is illustrated. The column heading is specified by the table heading <TH> Rank. Three entries are shown for that column. The first has table data entry for a rank of 2nd Lieutenant. The second has table data entry for a rank of Colonel and a third table data entry has an entry for a rank of Brigadier General. These ranks represent the specific content of the cells of the table. As shown in FIG. 2B, an attribute has been added to each of the table data tags to specify a sort key. Preferably, the sort key is a numeric. In this case, if the table were sorted by content, the 2nd Lieutenant entry would appear first, followed by the Brigadier General entry, followed by the Colonel entry. This follows a typical alpha-numeric sort convention. However, sorting alpha numerically does not distinguish important information about these titles and ranks. They do not make it clear that a 2nd Lieutenant is lower in rank than a Colonel which is yet lower in rank than a Brigadier General. Accordingly, an alternative way of presenting this information is by asserting a sort key value in the table data tag which permits the ranks to be sorted in an order which would be important to the military. If the sorting by sort key were done in ascending order, the cell entries would be arranged as shown in FIG. 2B with the lowest ranking title first and the highest ranking last. If one desired to sort these by Sortkey in descending order, the Brigadier General entry would be first, followed by the Colonel entry, followed by the 2nd Lieutenant entry. The creation of Sortkey attributes in the table data entries is preferably an authoring function applied by the author during the creation of the table page. Note that since the sort key is an attribute of and contained within a table data tag, it is not displayed. That is, it is hidden. Thus, hidden sort keys can permit an alternative arrangement of the data for a particular column in a way that is natural and useful.

FIG. 3 illustrates an exemplary browser display of the table data shown in FIG. 2A. When an HTML table, such as shown in FIG. 2A, is displayed, the browser makes an arrangement of the data by setting the headers at the top of each column and allocating space based on the widths of the various columns so that an orderly tabular presentation of data results. FIG. 3 shows such an exemplary arrangement.

Figure 4:
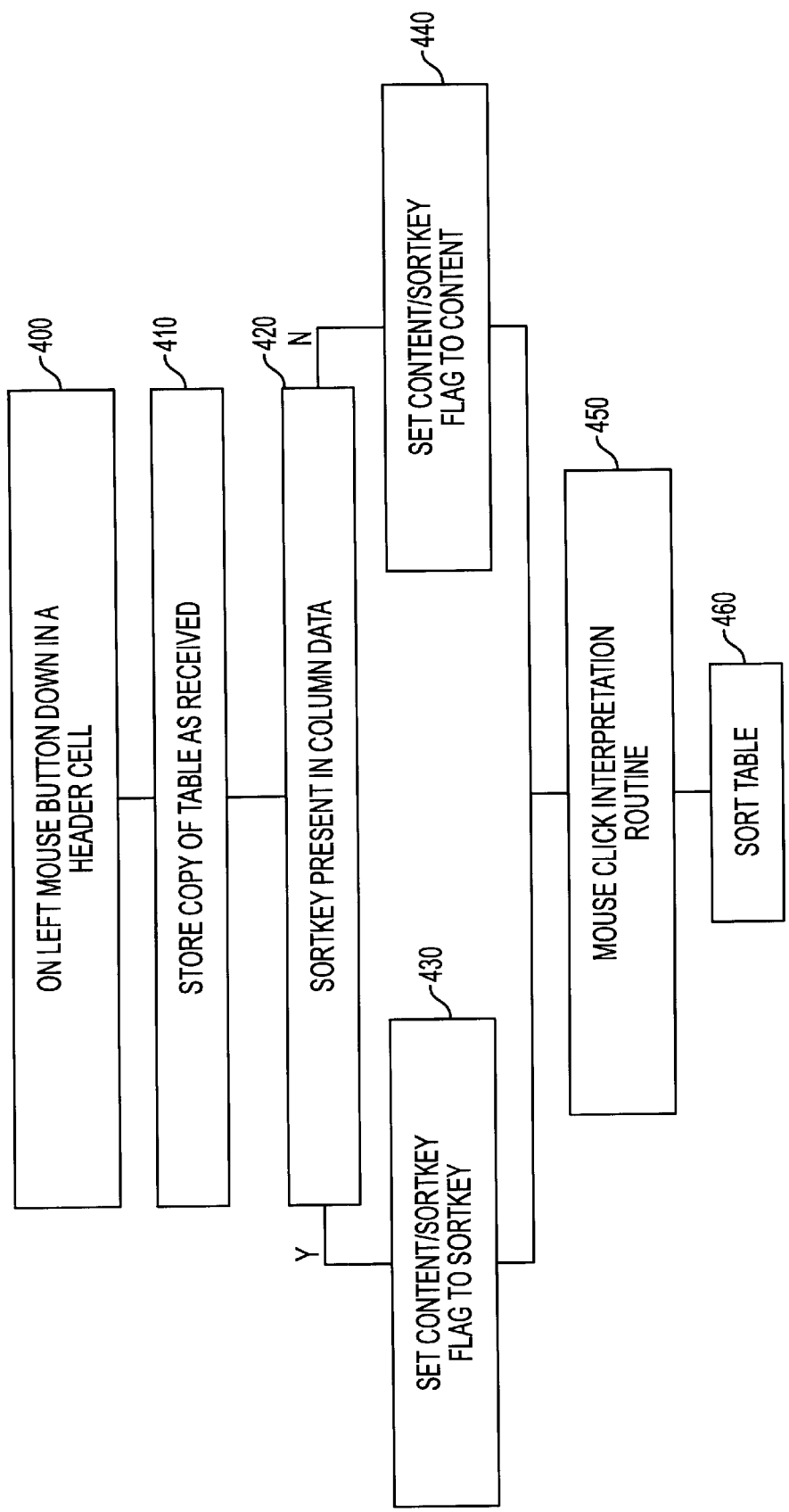
FIG. 4 is a flow chart of an exemplary process for carrying out local table sorting in accordance with one aspect of the invention.

FIG. 4 is a flow chart of an exemplary process for carrying out local table sorting in accordance with one embodiment of the invention. Considering the display shown in FIG. 3, when the cursor is over a cell containing header information (<TH> information), when the left mouse button is depressed (400), a copy of the table (e.g. a copy of a table received across the network) is stored (410). A check is made to determine whether or not Sortkeys are present in the column data. This can be done by simply by checking whether or not there are attributes associated with the <TD> entry in the column data. If Sortkeys are present (420-Y), a content/Sortkey flag is set to "Sortkey" (440). If there are no Sortkeys present in the column data (420-N), the content/Sortkey flag is set to content (430). Under either branch, mouse click interpretation routine 450 is invoked next. This routine is described more in detail hereinafter. Then, the table data is sorted (460) as described more fully hereinafter.

FIG. 5A is an exemplary pop-up menu used in accordance with one embodiment of the invention. Under certain conditions, discussed more hereinafter, it is appropriate to display a pop-up menu such as shown in FIG. 5A. This permits a user to specify a set of options conveniently. The options include settings for the sorting process. If menu selection 1 is selected, the table sorting will occur by hidden key in an ascending order. If menu selection 2 is selected, the sorting will be by hidden key in a descending order. If menu selection 3 is selected, the table data will be sorted by the content of the column in question. If menu selection 4 is selected, the table will be sorted by content in a descending order. If menu selection 5 is selected, the table will be restored to its default condition, that is, the condition before any sorting occurred. This is done by simply replacing the existing table information with a stored copy of the table information which was stored in conjunction with step 410 of FIG. 4. Menu selections 1–4 set flags which control the sort process as described more hereinafter.

FIG. 5B shows the semantics of exemplary flags used in accordance with one embodiment of the invention. In a preferred implementation, there are two flags, the first describes whether sorting is to be done based on the content of a table cell or upon the Sortkey contained as a hidden attribute in the table data tag. The second flag specifies whether data is to be sorted in an ascending or descending order. FIG. 5B illustrates the four combinations of two binary flags and their respective meanings.

Figure 6A:
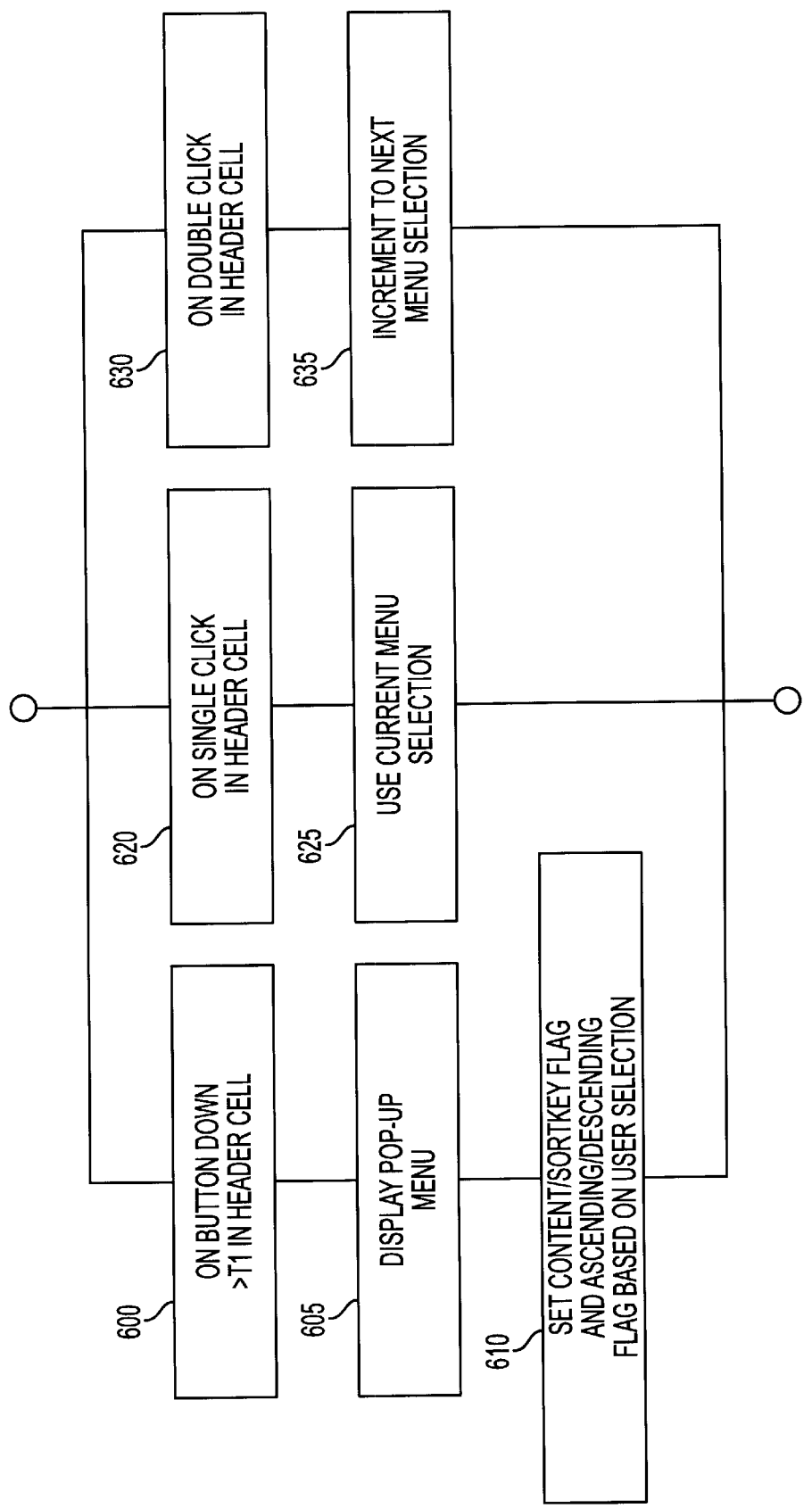
FIG. 6A is a flow chart of a first exemplary embodiment of a mouse click interpretation routine shown in FIG. 4.

FIG. 6A is a flow chart of a first exemplary embodiment of a mouse click interpretation routine as shown at step 450 in FIG. 4. In one embodiment, there are three possible mouse click interpretations. When the cursor is in a header cell, when the left mouse button is held down for a period of time greater than T1 (600), a display menu is popped up (605) which is the display menu shown in FIG. 5A. When the user makes a selection from the pop-up menu, the content/sort key flag and the ascending descending flags are set based on the user selection (610). When a single click is detected in a header cell (620), the default settings of the flags are utilized for the sort. If a double click is detected in the header cell (630), the current menu selection will be incremented to the next menu selection and the flag set accordingly. Thus, in FIG. 6A, depending on the mouse click action taken in the header cell, an appropriate combination of content/sort key and ascending/descending flag states will be determined and a sort state established for controlling the sorting.

Figure 6B:
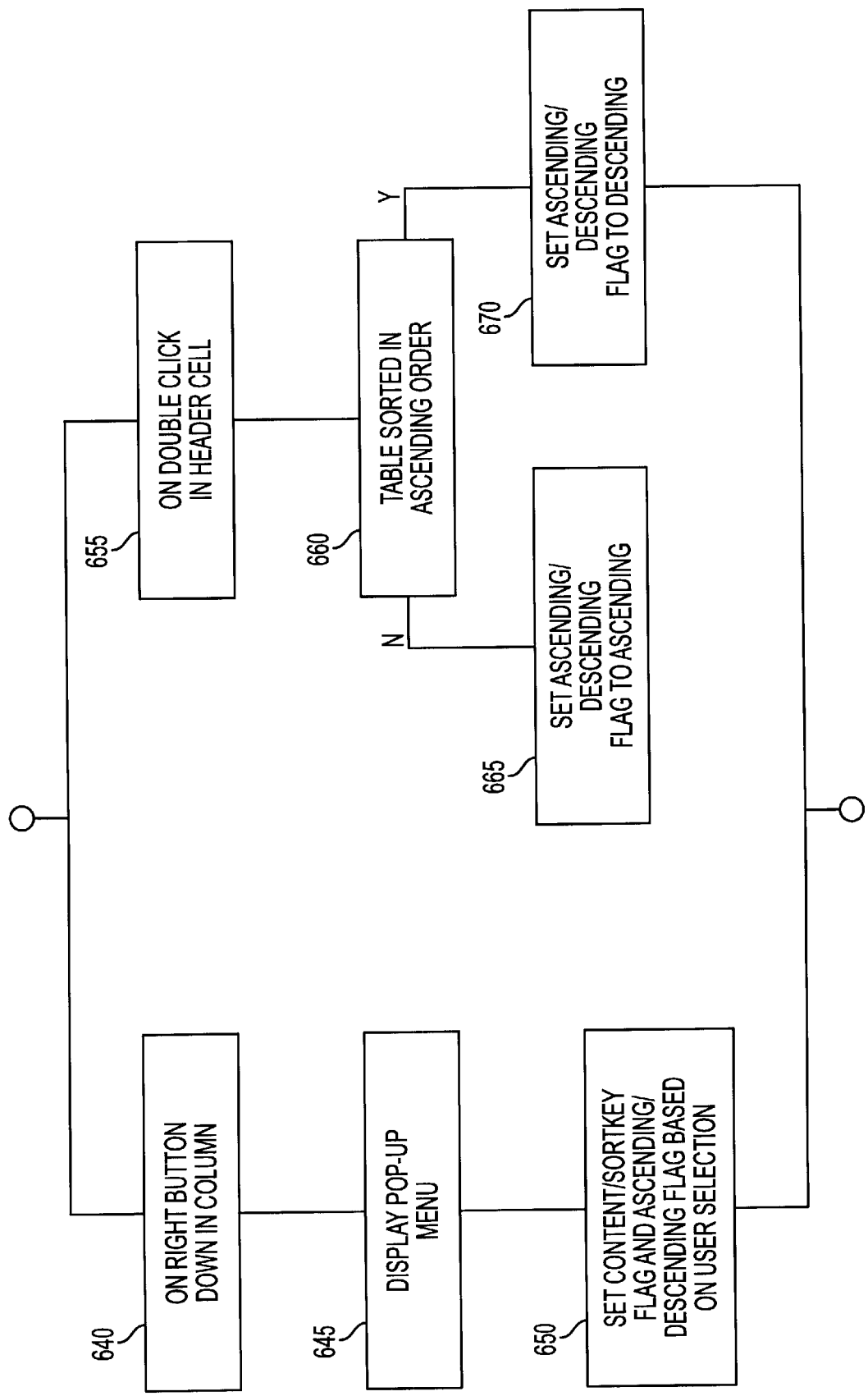
FIG. 6B is a flow chart of a second exemplary embodiment of a mouse click interpretation routine shown in FIG. 4.

FIG. 6B is a flow chart of a second exemplary embodiment of a mouse click interpretation routine shown in FIG. 4. In this embodiment, when the cursor is in a header cell of a table, when the right mouse button is depressed (640), the pop-up menu described in conjunction with FIG. 5A is displayed (645). As before, the user makes a selection from the pop-up menu and the content/Sortkey flag and ascending/descending flag are set (650). If a left mouse button double click is detected in the header cell (655), a check is made to see whether the table is sorted in ascending order for that column based on the existing value for the content/sort key flag. If it is not (660-N), the ascending/descending flag will be set to ascending (655) and the sort will occur. If the table is already sorted in ascending order (660-Y), the ascending/descending flag will be toggled to the descending state (670) before the sort occurs.

Figure 7:
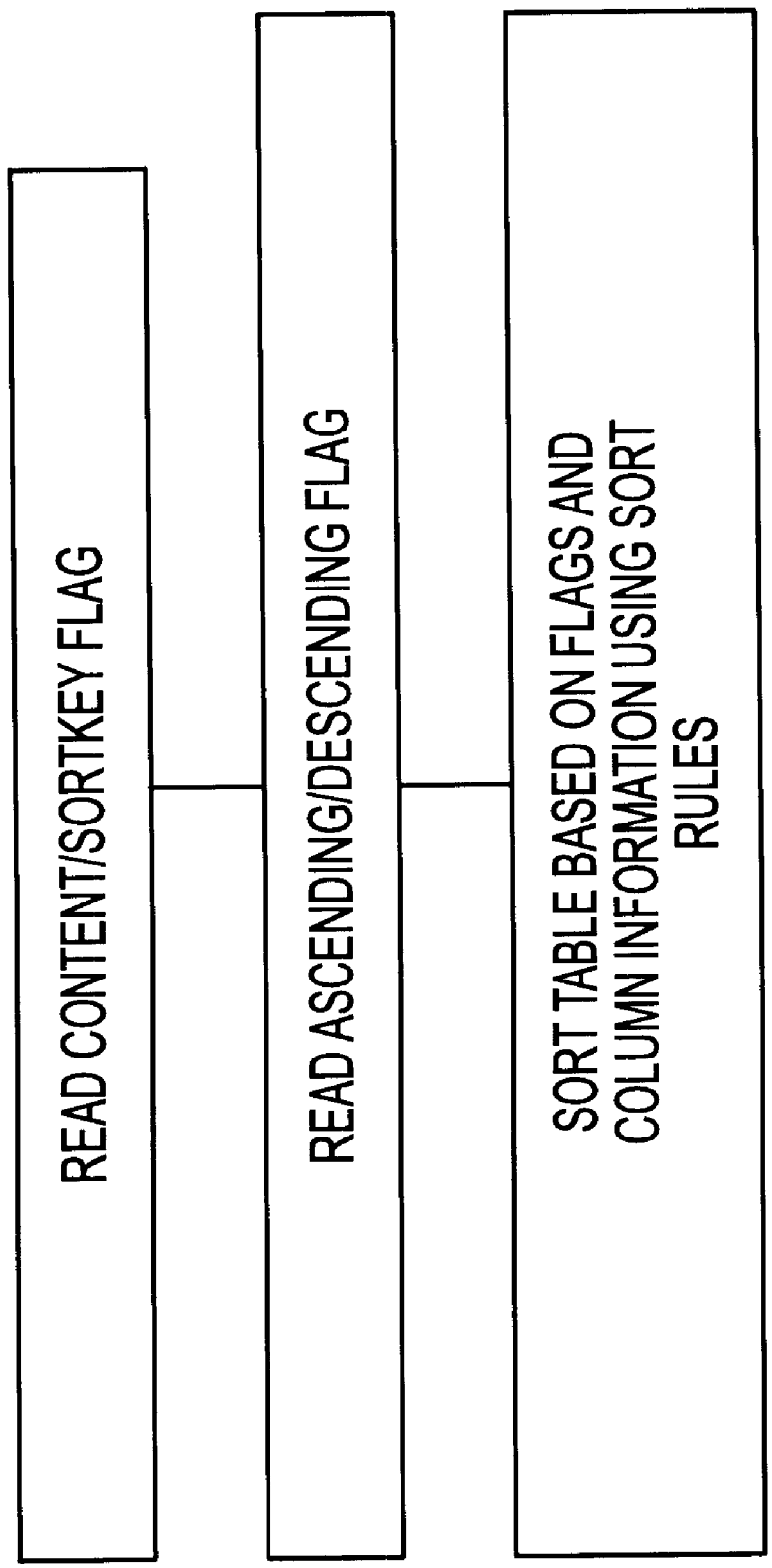
FIG. 7 is a flow chart of an exemplary sort table routine shown in FIG. 4.

FIG. 7 is a flow chart of an exemplary sort table routine shown in FIG. 4 at step 460. The state of the content/Sortkey flag is checked (700) and utilized to establish which information will be utilized for the sort. Similarly, the ascending/descending flag will be checked (710) to determine whether or not the sort should be in an ascending or descending order. Then, based on the state of the flags in the column information, the table is sorted using the sort rules described hereinafter (720).

FIG. 8 is an exemplary, but preferred list of rules used during sorting. These rules are stated with respect to an ascending sort, however, a descending sort can be defined by changing the word "before" in the rules to "after."

When alpha characters are compared, they are compared as if they were all upper case or all lower case. When comparing two cells each having a sort key, the smaller value is placed before a cell with a higher value. Cells with a sort key are placed before cells which do not have a sort key. Smaller numbers are placed before higher numbers. Numbers are placed before letters. Letters earlier in the alphabet are placed before letters later in the alphabet. If the cell contains an image, the cell is sorted by Sortkey, or, if it contains no Sortkey, it is sorted by the ALT text description of the image. The ALT text description of an image is one recommended by the HTML specifications to permit a visually impaired user to receive a description of the image by converting the text into audible words. It is also the text shown upon display of an HTML page when an image has not been downloaded yet. The ALT text content is placed in the image block in textual form until it is overwritten by the downloaded image. Finally, if two cells are rated equally after application of these rules, the cell received first in the original table is placed first.

In this manner, table data can be sorted locally in a variety of manners permitting a user to take different views of the data which greatly facilitates data analysis.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer, comprising:
   a. a processor, and
   b. a graphical user interface, running on said processor, said graphical user interface comprising a sort routine for rearranging table data based on one or more hidden sort keys.

2. The computer of claim 1 in which said table data is specified in a hypertext markup language (HTML) format.

3. The computer of claim 2 in which said sort key is provided as an attribute to an HTML table data identifier.

4. The computer of claim 1 in which said sort routine is invoked by clicking on a header cell of said table data.

5. The computer of claim 4 in which said sort routine will selectively sort based on cell content or on the hidden sort key.

6. The computer of claim 4 in which said sort routine will selectively sort in ascending or descending order.

7. The computer of claim 4 in which a pop-up menu is displayed.

8. The computer of claim 7 in which said pop-up menu permits a user to select at least one of the following sorting specifications:
   a. sort by hidden key in ascending order;
   b. sort by hidden key in descending order;
   c. sort by content in ascending order,
   d. sort by content in descending order, and e. restore table to original organization.

9. The computer of claim 1 in which table data may be selectively restored to its original organization.

10. A method of sorting table data, comprising the steps of:

a. associating a hidden sort key with at least one cell of table data; and b. selectively sorting said table data based on said hidden sort key.

11. The method of claim 10 in which said sorting is selectively based on cell content or on said hidden sort key.

12. A method of authoring table data, comprising the step of:

a. associating a sort key with cell data so that the sort key is not displayed.

13. The method of claim 12, in which the step of associating comprises including said sort key as an attribute of a cell data marker.

14. A method of displaying table data, comprising the steps of:

a. retrieving table information containing at least one hidden sort key over a network; and b. selectively sorting said table information based on said hidden sort key.

15. A system, comprising:

a. a network;

b. at least one server connected to said network;

c. at least one user computer connected to said network; and d. at least one user computer being configured to retrieve information from said server, including table information, and to sort said table information based on a hidden sort key.

16. A system, comprising:

a. a network;

b. at least one user computer connected to said network; and c. at least one server connected to said network;

d. at least one server being configured to store table information so that at least some cells of said table information include a hidden sort key.

17. A computer program product, comprising:

a. a memory medium; and b. a computer program, stored on said memory medium, said computer program comprising instructions for selectively sorting table data based on a hidden sort key.

18. A computer program product, comprising:

a. a memory medium; and b. computer controlling information, stored on said memory medium, associating a sort key with cell data of a table so that the sort key is not displayed.

* * * * *